United States Patent
Fan

(10) Patent No.: US 11,372,540 B2
(45) Date of Patent: Jun. 28, 2022

(54) TABLE PROCESSING METHOD, DEVICE, INTERACTIVE WHITE BOARD AND STORAGE MEDIUM

(71) Applicants: GUANGZHOU SHIYUAN ELECTRONIC TECHNOLOGY COMPANY LIMITED, Guangzhou (CN); GUANGZHOU SHIZHEN INFORMATION TECHNOLOGY CO., LTD., Guangzhou (CN)

(72) Inventor: Baoju Fan, Guangzhou (CN)

(73) Assignees: GUANGZHOU SHIYUAN ELECTRONIC TECHNOLOGY COMPANY LIMITED, Guangzhou (CN); GUANGZHOU SHIZHEN INFORMATION TECHNOLOGY CO., LTD., Guangzhou (CN)

( * ) Notice: Subject to any disclaimer, the term of this patent is extended or adjusted under 35 U.S.C. 154(b) by 18 days.

(21) Appl. No.: 17/488,294

(22) Filed: Sep. 29, 2021

(65) Prior Publication Data
US 2022/0019346 A1 Jan. 20, 2022

Related U.S. Application Data

(63) Continuation of application No. PCT/CN2019/124814, filed on Dec. 12, 2019.

(30) Foreign Application Priority Data

Jul. 16, 2019 (CN) .......................... 201910642635.4

(51) Int. Cl.
G06F 3/048 (2013.01)
G06F 3/04883 (2022.01)
G06F 3/04845 (2022.01)

(52) U.S. Cl.
CPC ...... G06F 3/04883 (2013.01); G06F 3/04845 (2013.01); G06F 2203/04806 (2013.01)

(58) Field of Classification Search
CPC ....................... G06F 3/048; G06F 2203/04806
See application file for complete search history.

(56) References Cited

U.S. PATENT DOCUMENTS 5,239,287 A * 8/1993 Siio .......................... G06F 40/18
345/163
6,055,550 A 4/2000 Wallack
(Continued)

FOREIGN PATENT DOCUMENTS

CN 1841361 A 10/2006
CN 104536690 A 4/2015
(Continued)

OTHER PUBLICATIONS

Abraham et al., Visual Specifications of correct Spreadsheets; 2005; IEEE; 8 pages.*
(Continued)

*Primary Examiner* — Linh K Pham
(74) *Attorney, Agent, or Firm* — Bayes PLLC

(57) ABSTRACT

A table processing method, device, an interactive white board and a storage medium is disclosed. The method therein includes, when an erasing instruction is received, determining whether a current erasing operation is in a first cell of a created table; and, in response to the erasing operation is in the first cell, when the erasing operation ends, updating the first cell to shrink the first cell.

16 Claims, 4 Drawing Sheets

(56) References Cited

U.S. PATENT DOCUMENTS

| | | | | |
|---|---|---|---|---|
| 7,581,169 B2* | 8/2009 | Thomson | ............. | G06F 40/174 |
| | | | | 715/223 |
| 9,740,676 B2* | 8/2017 | Logan | ..................... | G06F 40/18 |
| 2008/0104091 A1* | 5/2008 | Chin | ..................... | G06F 40/177 |
| 2011/0163968 A1* | 7/2011 | Hogan | .................. | G06F 3/0488 |
| | | | | 345/173 |
| 2014/0250398 A1* | 9/2014 | Andrews | ............ | G06F 3/04883 |
| | | | | 715/771 |
| 2016/0321230 A1 | 11/2016 | Wang et al. | | |

FOREIGN PATENT DOCUMENTS

| | | | | | |
|---|---|---|---|---|---|
| CN | 105677627 | A | | 6/2016 | |
| CN | 105760353 | A | * | 7/2016 | |
| CN | 106940690 | A | * | 7/2017 | |
| CN | 109164999 | A | * | 1/2019 | |
| CN | 109164999 | A | | 1/2019 | |
| CN | 109284494 | A | * | 1/2019 | ........... G06F 40/177 |
| CN | 109284494 | A | | 1/2019 | |
| CN | 109885819 | A | | 6/2019 | |
| CN | 110427601 | A | | 11/2019 | |

OTHER PUBLICATIONS

Sarkar et al., calculation View : multiple-representation edting in speadsheets; 2018; IEEE; 9 pages.*

He et al., Real-Time Whiteboard Capture and Processing Using a Video Camera for Remote Collaboration; ©2006; IEEE; Real-Time Whiteboard Capture and Processing Using a Video Camera for Remote Collaboration; 9 pages.*

International Search Report issued in corresponding international application No. PCT/CN2019/124814, dated Apr. 16, 2020, 2 pages.

* cited by examiner

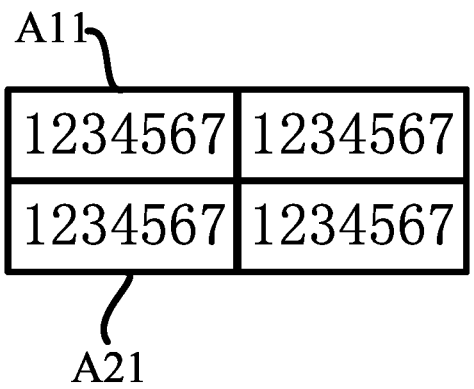
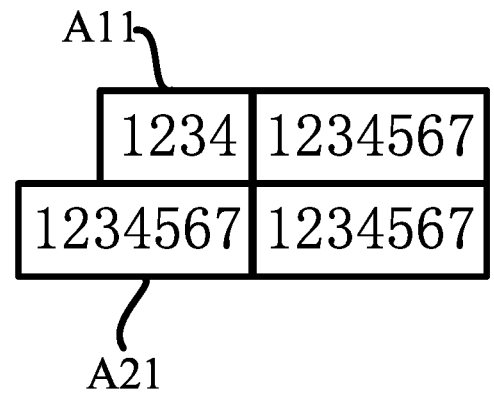
Fig. 2aFig. 2b
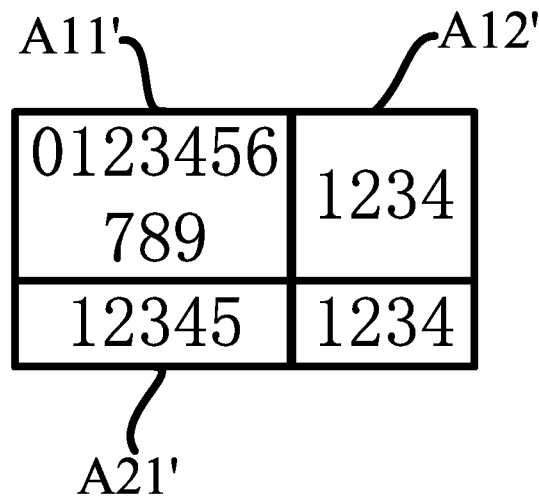
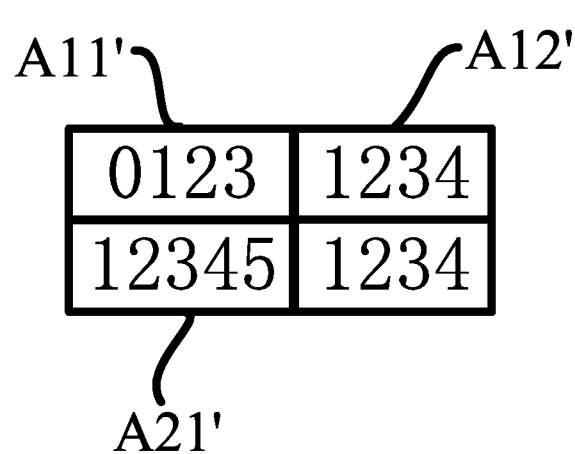
Fig. 3aFig. 3b

TABLE PROCESSING METHOD, DEVICE, INTERACTIVE WHITE BOARD AND STORAGE MEDIUM

CROSS-REFERENCE TO RELATED APPLICATION

The present application is a continuation of International Application No. PCT/CN2019/124814, filed on Dec. 12, 2019, which claims the benefit of priority to Chinese Patent Application No. 201910642635.4, filed on Jul. 16, 2019, both of which are incorporated in by reference in their entireties.

TECHNICAL FIELD

The present disclosure relates to the field of computer technology, for example, to a table processing method, a device, an interactive white board and a storage medium.

BACKGROUND

In teaching or conferences, a user generally needs to use an installed electronic whiteboard application to perform board-writing or writing on the electronic whiteboard, or edit a content displayed on the electronic whiteboard, so as to deepen the audience's understanding of the teaching content or conference content.

SUMMARY

In view of this, in order to at least solve the technical problems of the related technology—impossible to automatically adjust a cell according to user's operation of erasing a content in the cell, resulting in inability to make targeted adjustments for a specific cell, cumbersome user operations, and time-consuming table adjustments—the present disclosure provides a table processing method, a device, an interactive white board and a storage medium.

In a first aspect of the embodiments of the present disclosure, a table processing method is provided. The method includes determining whether a current erasing operation is in a first cell of a created table when an erasing instruction is received; and, if the erasing operation is in the first cell, updating the first cell when the erasing operation ends, so as to shrink the first cell.

In a second aspect of the embodiments of the present disclosure, a table processing device is provided. The device includes a first determining module configured to determine whether a current erasing operation is in a first cell of a created table when an erasing instruction is received; and a first updating module configured to update the first cell to shrink the first cell when the first determining module determines that the erasing operation is in the first cell and the erasing operation ends.

In a third aspect of the embodiments of the present disclosure, an interactive white board is provided. The interactive white board includes a processor; and a storage device configured to store a computer program executed by the processor. When executing the program, the processor implements steps of the above-mentioned table processing method.

In a fourth aspect of the embodiments of the present disclosure, a computer-readable storage medium is provided, on which a computer program is stored, and when the program is executed by a processor, steps of the above-mentioned table processing method are implemented.

Compared with the related technologies, the embodiments of the present disclosure include the following beneficial effects. In the embodiment of the present disclosure, when an erasing instruction is received, the cell is correspondingly shrunk according to an erasing operation in the cell, so as to realize an automatic adjustment of the cell where the erasing operation of the user is located, thereby eliminating the need for the user to manually adjust the cells, which can simplify user operations, improve the adjustment efficiency and accuracy of the cell, and meet the user's requirement for targeted adjustment of the specific cell such as the cell where the erasing operation is located.

It should be understood that the above general description and the following detailed description are only exemplary and explanatory, and cannot limit the present disclosure.

BRIEF DESCRIPTION OF THE DRAWINGS

The accompanying drawings, which are incorporated herein and form a part of the specification, illustrate aspects of the present disclosure and, together with the description, further serve to explain the principles of the present disclosure and to enable a person skilled in the pertinent art to make and use the present disclosure.

FIG. 2a is a schematic diagram of a table where a first cell with an unerased content is located, according to an exemplary embodiment of the present disclosure.

FIG. 2b is a schematic diagram showing the first cell in FIG. 2a which is shrunk due to the content being erased, according to an exemplary embodiment of the present disclosure.

FIG. 3a is a schematic diagram showing another table where a first cell with an unerased content is located, according to an exemplary embodiment of the present disclosure.

FIG. 3b is a schematic diagram showing that all cells in the row and column where the first cell in FIG. 3a is located are shrunk due to the content being erased, according to an exemplary embodiment of the present disclosure.

Figure 1:
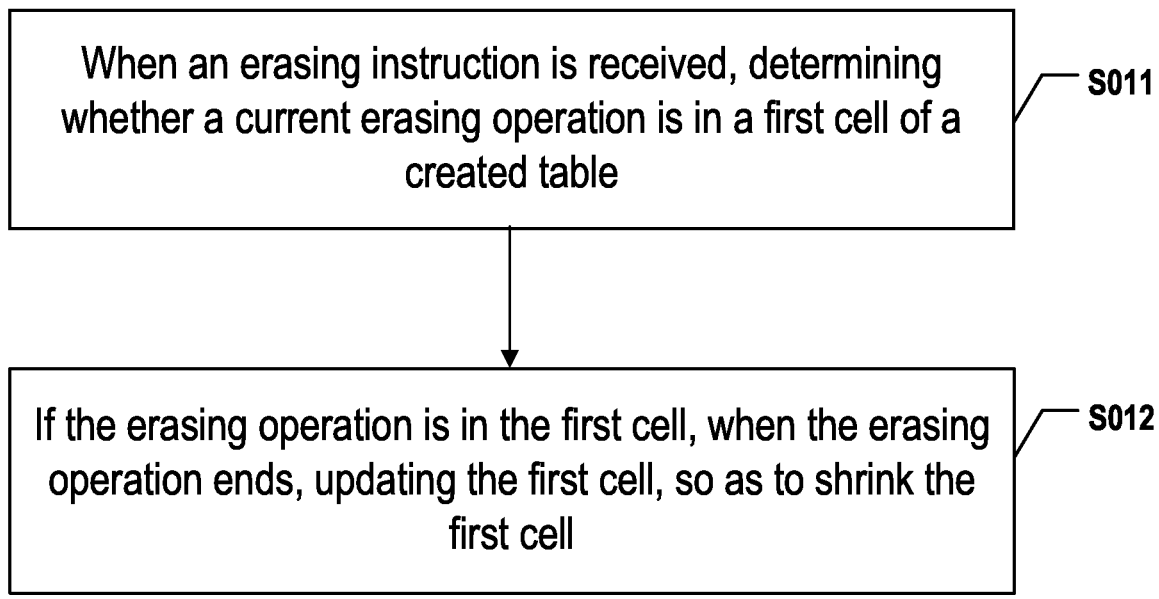
FIG. 1 is a flowchart of a table processing method, according to an exemplary embodiment of the present disclosure.

The present disclosure will be described with reference to the accompanying drawings.

DETAILED DESCRIPTION

Exemplary examples will be described in detail herein, and the examples are shown in the accompanying drawings. When the following description refers to the accompanying drawings, unless otherwise indicated, the same numbers in different drawings represent the same or similar elements.

And, the embodiments described in the following exemplary examples do not limit the present disclosure.

The terms used in the present disclosure are only for the purpose of describing specific examples, and are not intended to limit the present disclosure. The singular forms of "a," "the" and "this" used in the present disclosure and appended claims are also intended to include plural forms, unless the context clearly indicates other meanings. It should also be understood that the term "and/or" as used herein refers to and includes any or all possible combinations of one or more associated listed items.

It should be understood that although the terms first, second, third, etc. may be used in the present disclosure to describe various information, the information should not be limited to these terms. These terms are only used to distinguish the same type of information from each other. For example, without departing from the scope of the present disclosure, the first information may also be referred to as second information, and similarly, the second information may also be referred to as first information. Depending on the context, the word "if" as used herein can be interpreted as "when," "while" or "in response to determination."

In teaching or conferences, a user generally needs to use an installed electronic whiteboard application to perform board-writing or writing on the electronic whiteboard, or edit a content displayed on the electronic whiteboard, so as to deepen the audience's understanding of the teaching content or conference content. Thereinto, the user can insert at least one of electronic table, geometric figure, and picture into the electronic whiteboard through an insert function provided by the whiteboard application. Thereinto, the user can write a content in a created electronic table or erase a content displayed in the electronic table. However, since the size of the current electronic table does not change with the amount of content written in or erased from the electronic table by the user, when the content written to a certain cell in the table by the user exceeds a boundary of the cell, the user can only enlarge the entire electronic table by dragging a zooming control on the electronic table. In the same way, when the user needs to shrink the cell after erasing the content of the cell, the user can only shrink the entire electronic table by dragging the zooming control. Regardless of either operation, although the size of the cell can be adjusted by the above table adjustment method, since the control is used to zoom the entire electronic table, each cell in the electronic table will be zoomed at the same time, which cannot satisfy the user's requirements for targeted zooming of a certain cell. And since in the process of adjusting the electronic table, the user can only rely on the naked eye to observe whether the currently zoomed electronic table meets the adjustment requirements, for example, the content of each cell in the shrunk electronic table cannot exceed the boundary of the cell, and cannot accurately determine an appropriate zoom level, adjustments needs to be repeated to achieve the adjustment requirements, which results in cumbersome user operations and time-consuming table adjustments.

On this basis, in order to at least solve the technical problems of the related technology—impossible to automatically adjust a cell according to user's operation of erasing a content in the cell, resulting in the user's inability to make targeted adjustments for a specific cell, cumbersome user operations, and time-consuming table adjustments—the present disclosure provides a new table processing method, so as to realize an automatic adjustment of the cell where the erasing operation of the user is located, thereby eliminating the need for the user to manually adjust the cells, which can simplify user operations, improve the adjustment efficiency and accuracy of the cell, and further meet the user's requirement for targeted adjustment of specific cells such as the cell where the erasing operation is located.

The table processing method provided by the embodiment of the present disclosure may be executed by software, hardware, or cooperatively executed by a combination of software and hardware. The hardware involved thereinto may be composed of one or more physical entities. For example, an execution subject of the table processing method in the embodiment of the present disclosure may be a function module loaded on a laptop computer, a desktop computer, a tablet computer, a mobile phone, a projector, or an interactive white board, or it may be a laptop computer, a desktop computer, a tablet computer, a mobile phone, a projector, or an interactive white board.

Hereinafter, the table processing method provided by the embodiment of the present disclosure will be described.

As shown in FIG. 1, FIG. 1 is a flowchart of a table processing method, according to an exemplary embodiment of the present disclosure. The table processing method can be applied to a client and includes the following steps. In step S011, when an erasing instruction is received, determining whether the current erasing operation is in a first cell of a created table, and in step S012, if the erasing operation is in the first cell, when the erasing operation ends, updating the first cell, so as to shrink the first cell.

Taking a whiteboard application installed on an interactive white board as an example, when the whiteboard application is started in a foreground, a user can create a required table through a table creation function of the whiteboard application. After the table is created, the user can insert or write a required content in the table, which can be understood as follows. The user can insert the required content through an insert control provided by the whiteboard application, for example, a picture, a geometric figure or a text; the user can also input a required content through a writing control provided by the whiteboard application, for example, a pattern, a collection of graphics, or text composed of handwritings.

It should be noted that when the table is created, coordinate information of each cell in the table is stored. The coordinate information can be expressed in, but not limited to, any of the following forms. As a first expression form of the coordinate information, in an example, for each cell, the coordinate information of the cell may include, but is not limited to, coordinates of four vertices of the cell; as a second expression form of the coordinate information, in another example, for each cell, the coordinate information of the cell may include, but is not limited to, a coordinate of one of the four vertices of the cell, and a width value and a height value of the cell.

From the above two expression forms of the coordinate information, it can be seen that in the second expression form, only the coordinate information including the coordinate of a vertex of the cell, and the width value and the height value of the cell need to be stored, while in the first expression form, the coordinate information including the coordinates of the four vertices of the cell needs to be stored. It can be seen that the data volume of the coordinate information for the second expression form is less than that of the coordinate information for the first expression form, so under a requirement for reducing the data storage volume, the coordinate information in the second expression form can be used.

When the user needs to erase the content displayed on the whiteboard interface of the whiteboard application, an erasing instruction can be triggered by clicking an erasing control provided by the whiteboard application, so that an execution subject of the method can, according to the erasing instruction, know that the user operation currently detected by the touch screen is an erasing operation.

After the erasing operation corresponding to the erasing instruction is detected, an erasing coordinate set of an erasing trajectory of the erasing operation can be acquired to determine whether the erasing operation is in the first cell of the created table according to the erasing coordinate set. The first cell is used to indicate any cell in the table. At the same time, a content displayed on the whiteboard interface can also be updated and displayed according to the erasing coordinate set, so as to present the user with an effect that the erased content disappears with the erasing operation.

Hereinafter, an example illustrates the process of determining whether the erasing operation is in the first cell of the created table. Since the erasing operation may exist in more than one cell, the cell where each erased pixel point therein is located can be determined according to the erasing coordinate set. For example, it is assumed that the erasing coordinate set is $\{(x_{o1}, y_{o1}), (x_{o2}, y_{o2})\}$. In the scenario of determining whether the erasing operation is in the first cell of the created table based on all pixel points in the erasing coordinate set—

1. In the case where the coordinate information of a cell includes the coordinates of the four vertices of the cell, the coordinate information of two cells in the table can be expressed as follows. Cell A1: $\{(x_{A11}, y_{A11}), (x_{A11}, y_{A12}), (x_{A12}, y_{A11}), (x_{A12}, y_{A12})\}$, wherein $x_{A11} < x_{A12}$, $y_{A11} < y_{A12}$; cell A2: $\{(x_{A21}, y_{A21}), (x_{A21}, y_{A22}), (x_{A22}, y_{A21}), (x_{A22}, y_{A22})\}$, wherein, $x_{A21} < x_{A22}$, $y_{A21} < y_{A22}$. On this basis, if $x_{A11} \leq x_{o1} \leq x_{A12}$ while $y_{A11} \leq y_{o1} \leq y_{A12}$, and $x_{A21} \leq x_{o2} \leq x_{A22}$ while $y_{A21} \leq y_{o2} \leq y_{A22}$, it can be determined and obtained that an erased pixel point $(x_{o1}, y_{o1})$ is located in cell A1, and an erased pixel point $(x_{o2}, y_{o2})$ is located in cell A2.

2. In the case where the coordinate information of a cell includes a coordinate of one of the four vertices of the cell, and a width value and a height value of the cell, it is assumed that the coordinate information records the coordinate of the left vertex of the cell, then the coordinate information of two cells in the table can be expressed as follows. Cell A1: $\{(x_{A1}, y_{A1}), w_{A1}, h_{A1}\}$, cell A2: $\{(x_{A2}, y_{A2}), w_{A2}, h_{A2}\}$. On this basis, if $x_{A1} \leq x_{o1} \leq x_{A1} + w_{A1}$ while $y_{A1} \leq y_{o1} \leq y_{A1} + h_{A1}$, and $x_{A2} \leq x_{o2} \leq x_{A2} + w_{A2}$ while $y_{A2} \leq y_{o2} \leq y_{A2} + h_{A2}$, it can be determined and obtained that an erased pixel point $(x_{o1}, y_{o1})$ is located in cell A1, an erased pixel point $(x_{o2}, y_{o2})$ is located in cell A2.

As a result, the cell where each erased pixel point in the erase coordinate set of the erasing operation is located is determined and obtained, and in subsequent steps, a shrinking processing can be performed on each determined and obtained cell.

However, it can also be seen that the above solution needs to analyze the position of each erased pixel point under one erasing operation, and one erasing operation generally corresponds to a large number of erased pixel points, which leads to more times of the involved position analysis calculation, and a more complicated calculation process. And since different erased pixel points may fall into different cells, it may also lead to the need to shrink multiple cells, and as a result, the complexity of the calculation is increased. Therefore, in order to at least solve this technical problem, in another embodiment, it is possible to determine whether the erasing operation falls into the cells of the created table based on only an erasing start point of the erasing operation, which can be understood as—even if the cell where erased pixel points other than the erasing start point in the erasing operation are located is different from the cell of the erasing start point, it can be considered that the erasing operation falls into the cell where the erasing start point is located. Correspondingly, if the erasing operation exceeds the cell where the erasing start point is located, the content exceeding the cell where the erasing start point is located is not erased. Therefore, for each erasing operation, it is only necessary to judge whether the erasing starting point of the erasing operation falls into a certain cell of the created table to know whether the erasing operation is in a cell of the created table. Compared with the previous technical solution, the amount of calculation involved in the position analysis of the erasing operation can be reduced to a large extent. And the content exceeding the cell where the erasing start point is located is not erased, so that the content in cells other than the cell where the erasing start point is located will not be erased, so that in the subsequent steps, the need to perform a shrinking processing on cells other than the cell where the erasing start point is located is eliminated, which can reduce the amount of calculation involved in the shrinking processing of the cell, thereby facilitating improving the efficiency of updating the cell.

On the basis of the previous embodiment, if the user needs to erase the contents in cells other than the cell where the erasing start point is located, he can end the current erasing operation, and perform the next erasing operation, so that part or all of the contents of another cell can be erased.

Therefore, in the scenario of determining whether the erasing operation is in the first cell of the created table based on the erasing start point, the determination process can be adaptively adjusted as follows.

It is assumed that the coordinate of the erasing start point is $(x_0, y_0)$, then—

1. In the case where the coordinate information of a cell includes the coordinates of the four vertices of the cell, the coordinate information of one cell A1 in the table can be expressed as: $\{(x_{A11}, y_{A11}), (x_{A11}, y_{A12}), (x_{A12}, y_{A11}), (x_{A12}, y_{A12})\}$, wherein $x_{A11} < x_{A12}$, $y_{A11} < y_{A12}$. On this basis, if $x_{A11} \leq x_0 \leq x_{A12}$ and $y_{A11} \leq y_0 \leq y_{A12}$, it can be known that the erasing start point $(x_0, y_0)$ is located in cell A1, so it can be determined that the erasing operation is in the first cell of the created table.

2. In the case where the coordinate information of a cell includes a coordinate of one of the four vertices of the cell, and a width value and a height value of the cell, it is assumed that the coordinate information records the coordinate of the left vertex of the cell, then the coordinate information of the cell A1 in the table can be expressed as $\{(x_{A1}, y_{A1}), w_{A1}, h_{A1}\}$. On this basis, if $x_{A1} \leq x_0 \leq x_{A1} + w_{A1}$ and $y_{A1} \leq y_0 \leq y_{A1} + h_{A1}$, it can be known that the erasing start point $(x_0, y_0)$ is located in the cell A1, so it can be determined that the erasing operation is in the first cell of the created table.

It should be noted that in the case where the coordinate information of a cell includes a coordinate of one of the four vertices of the cell, and a width value and a height value of the cell, it can be defaulted that the coordinate of the unique vertex included in the coordinate information is any one of the upper left vertex, the lower left vertex, the upper right vertex, and the lower right vertex of the cell, so that it can be known which vertex of the cell is the unique vertex, so as to determine the region range of the cell according to the unique vertex and the width value and height value of the cell, and further determine whether the erasing operation is in the cell. However, in order to quickly determine the region range of the cell, in an embodiment, the coordinate of one of the four vertices of the cell included in the coordinate information may be defaulted to be the coordinate of the upper left vertex of the cell.

After it is determined that the erasing operation is in the first cell of the created table, if it is detected that the erasing operation is interrupted, the erasing operation can be considered to be ended. Thereinto, the erasing operation can be regarded as interrupted when any of the following situations is detected—the position of the erasing operation within a preset time period remains unchanged, or no erasing operation is detected at a certain moment after the erasing operation occurs. No erasing operation being detected at a certain moment after the erasing operation occurs can be understood as—after the user performs the erasing operation, the touch between the touch object used to trigger the erasing operation and the touch screen is released at a certain moment, and the input of the touch object will not be detected at this time, so it can be regarded that the erasing operation is interrupted. The touch object may include at least one of a stylus and a finger, but is not limited thereto.

Since the content in the cell where the erasing operation is located will be updated with the erasing operation, the pixel coordinate set corresponding to the content will also be updated. Therefore, when the erasing operation ends, the first cell can be updated according to the pixel coordinate set corresponding to the current content in the first cell where the erasing operation is located, and the first cell after the update is shrunk as compared with the first cell before the update. It can be seen from FIG. 2a that, before the content is erased, the size of the first cell A11 is the same as that of the cell A21. It can be seen from FIG. 2b that, after part of the content "567" of the first cell A11 is erased, the shrunk first cell A11 is smaller than the cell A21.

Therefore, when the erasing instruction is received, the cell is correspondingly shrunk according to the erasing operation in the cell, so that the cell where the erasing operation of the user is located is automatically adjusted, thereby eliminating the need for the user to manually adjust the cell, which can simplify user operations, improve the adjustment efficiency and accuracy of the cell, and further meet the user's requirement for targeted adjustment of a specific cell, such as the cell where the erasing operation is located.

In an embodiment, only the first cell where the erasing operation is located may be updated. On this basis, in step S012, updating the first cell may include—in step S0121, when there is an unerased content in the first cell, acquiring a minimum height value and a minimum width value of a vacant region between a boundary of the first cell and an edge of the unerased content; and, in step S0122, according to the minimum height value and the minimum width value, respectively updating a height and a width of the first cell.

Thereinto, whether there is an unerased content in the first cell may be determined according to a preset relational database. The data pre-stored in the relational database may include, but not limited to, a mapping relationship between the created table and all cells that make up the created table, and a mapping relationship between each cell and the content in the cell. However, the manner of determining whether there is an unerased content in the first cell in the present disclosure is not limited to this. For example, it is possible to find a content that falls into the region range of the first cell based on the coordinate information of the first cell.

If there is an unerased content in the first cell, the pixel coordinate set corresponding to the unerased content can be acquired. Subsequently, according to the coordinate information of the first cell and the pixel coordinate set corresponding to the unerased content, a leftmost pixel point closest to a left boundary line of the first cell, an uppermost pixel closest to an upper boundary line of the first cell, a rightmost pixel closest to a right boundary line of the first cell, and a lowermost pixel closest to a lower boundary line of the first cell can be acquired from the pixel coordinate set corresponding to the unerased content. On this basis, the minimum height value of the vacant region between a boundary of the first cell and an edge of the unerased content is equal to the sum of a first height distance value between the upper boundary line of the first cell and the uppermost pixel point, and a second height distance value between the lower boundary line of the first cell and the lowermost pixel point. In the same way, the minimum width value of the vacant region between a boundary of the first cell and an edge of the unerased content is equal to the sum of a first width distance value between the left boundary line of the first cell and the leftmost pixel point, and a second width distance value between the right boundary line of the first cell and the rightmost pixel point.

Under the premise of ensuring that the content in the first cell does not exceed the boundary of the first cell after being shrunk, it can be seen from the above that a maximum margin for the width of the first cell before being shrunk is the minimum width value, and a maximum margin for the height of the first cell before being shrunk is the minimum height value. Therefore, in an embodiment, the width value of the first cell may be updated to the difference (this difference value is referred to as a target width value hereinafter) between the width value of the first cell before the update and the minimum width value, and the height value of the first cell may be updated to the difference (this difference value is referred to as a target height value hereinafter) between the height value of the first cell before the update and the minimum height value.

After the above update, the first cell is shrunk, but the size of the unerased content remains unchanged. At this time, the edge of the unerased content connects or overlaps with the boundary of the first cell after being shrunk. As a result, the user may not be able to see the edge of the unerased content, which may affect the user's viewing. Therefore, in order to at least solve this technical problem, ensure the display effect of the unerased content in the first cell after being shrunk, and improve user's experience, in another embodiment, a certain preset margin may be reserved between the edge of the unerased content and the boundary of the first cell, and the preset margin may be a value defined by the user or a value set by default in the system. On this basis, in the process of updating the first cell, the width value of the first cell may be updated to the sum (this sum is referred to as a target width value hereinafter) of the difference between the width value of the first cell before the update and the minimum width value, and the preset margin. And the height value of the first cell can be updated to the sum (this sum is referred to as a target height value hereinafter) of the difference between the height value of the first cell before the update and the minimum height value, and the preset margin. As a result, a certain gap can be left between the boundary of the first cell after being shrunk and the edge of the unerased content, which improves the effect of clearly displaying the unerased content.

It can be known from the above that the width value and the height value of the first cell after being shrunk are target width value and the target height value in any of the above-mentioned embodiments, respectively. However, when the target width value and target height value are relatively small, for example, based on the target width value and the target height value calculated and obtained for the unerased content of one pixel point, if the width value and the height value of the first cell are directly updated to the target width value and the target height value respectively, the first cell will be too small as compared with other cells. Since the first cell is too small, the user may be unable to see the region of the first cell clearly, which may affect the writing or erasing operations of the user in the first cell. Therefore, in order to at least solve this technical problem and prevent the cell from being shrunk too much, in another embodiment, the solution that the height and width of the first cell are respectively updated according to the minimum height value and the minimum width value is changed. On this basis, in the step S0122, according to the minimum height value and the minimum width value, respectively updating a height and a width of the first cell may include the following steps—in step S01221, according to a current height value of the first cell and the minimum height value, calculating and obtaining a target height value for updating the height of the first cell, and according to a current width value of the first cell and the minimum width value, calculating and obtaining a target width value for updating the width of the first cell; in step S01222, if the target height value is greater than a preset height threshold, updating a height value of the first cell to the target height value, and if the target height value is less than or equal to the preset height threshold, updating the height value of the first cell to the preset height threshold; and in step S01223, if the target width value is greater than a preset width threshold, updating a width value of the first cell to the target width value, and if the target width value is less than or equal to the preset width threshold, updating the width value of the first cell to the preset width threshold.

Thereinto, for the calculation manners of the target height value and the target width value, reference is made to the above relevant description, which will not be repeated herein. The preset height threshold and the preset width threshold can be preset by the user as needed, or can be preset by the developer based on experience or experiment. The preset height threshold and the preset width threshold are used to characterize a maximum shrinking degree that allows the first cell to be shrunk, which can be understood as—the width of the first cell after being shrunk cannot be smaller than the preset width threshold, and the height cannot be smaller than the preset height threshold.

Therefore, it can be ensured that the width value of the first cell after being shrunk will not be smaller than the preset width threshold, and the height value will not be smaller than the preset height threshold, thereby well avoiding the situation that the first cell after the update is too small due to the target width value or the target height value of the first cell being too small, which ensures that the user can see the region of the first cell clearly and reduces the writing or erasing difficulty for user in the first cell after being shrunk.

Since part or all of the content in the first cell can be erased through one erasing operation, in the scenario where all the content in the first cell is erased, in order to improve the update efficiency of the first cell, in an embodiment, updating the first cell in the step S012 may further include— in step S0123, when there is no unerased content in the first cell, respectively updating a height value and a width value of the first cell to a preset height threshold and a preset width threshold.

Therefore, when there is no unerased content in the first cell, by directly updating the height value and the width value of the first cell to the preset height threshold and the preset width threshold respectively, the need to perform a calculation of the target height value and the target width value is eliminated, which can save more calculation steps, thereby facilitating reducing the computational burden of the system, simplifying the update process of the first cell, and improving the update efficiency of the first cell.

Although the update of the first cell can be achieved through any of the above-mentioned embodiments, since only the first cell is updated as described above, which may result in a larger difference between the first cell after the update and its adjacent cells. As shown in FIG. 2b, it can be seen from FIG. 2b that the first cell A11 after being shrunk is not aligned with the left side of the cell A21 in the same column, which may cause the user unable to determine at a glance which cells are other cells in the same column or the same row as the first cell, and also affect the visual effect of the entire table. Therefore, in order to at least solve this technical problem, in an embodiment, in addition to updating the first cell, other cells in the row and column where the first cell is located may also be updated. On this basis, in the step S012, updating the first cell may include—in step S0121', for each of all cells in a row where the first cell is located, acquiring a minimum height value of a vacant region between a boundary of the cell and an edge of a content in the cell, and for each of all cells in a column where the first cell is located, acquiring a minimum width value of a vacant region between a boundary of the cell and an edge of a content in the cell; in step S0122', acquiring a target minimum height value with a smallest value from all the minimum height values, and acquiring a target minimum width value with a smallest value from all the minimum width values; and in step S0123', according to the target minimum height value, updating heights of all cells in the row where the first cell is located, and according to the target minimum width value, updating widths of all cells in the column where the first cell is located.

Thereinto, the principle of acquiring the minimum height value of each cell in the row where the first cell is located and the minimum width value of each cell in the column where the first cell is located is the same as that of acquiring the minimum height value and the minimum width value of the first cell described above, which is not repeated herein.

After acquiring the minimum height value of each cell in the row where the first cell is located and the minimum width value of each cell in the column where the first cell is located, the target minimum height value with a smallest value selected therefrom represents the maximum margin for the height of a certain cell on the row where the first cell is located, and in the same way, the target minimum width value with the smallest value selected therefrom represents the maximum margin for the width of a certain cell in the column where the first cell is located. It can be seen that the maximum margin for the height of the cell corresponding to the target minimum height value is less than that of other cells in the same row, and the maximum margin for the width of the cell corresponding to the target minimum width value is less than that of other cells in the same column. Therefore, in order to avoid that a content of each cell in the row and column where the first cell is located exceeds the boundary of the cell after the cell is shrunk, in this example, the heights of all the cells in the row where the first cell is located is updated according to the target minimum height value, and the widths of all the cells in the column where the first cell is located is updated according to the target minimum width value. Thereinto, according to any one embodiment in the above-mentioned calculation manners of the target height value and the target width value, the target height value used to update the heights of all the cells in the row where the first cell is located and the target width value used to update the widths of all the cells in the column where the first cell is located are respectively calculated and obtained according to the target minimum height value and the target minimum width value.

Therefore, the updated height values of all cells in the row where the first cell is located are the target height values, and the updated width values of all cells in the column where the first cell is located are the target width values. As shown in FIG. 3a, before the content in the first cell A11' is erased, the width of the first cell A11' is consistent with that of the cell A21', and the height of the first cell A11' is consistent with that of cell A12'. As shown in FIG. 3b, after the content "456789" in the first cell A11' is erased, since a width space occupied by the unerased content "0123" in the first cell A11' is smaller than that occupied by the content "12345" in the cell A21', when being shrunk, the first cell A11' and the cell A21' in the same column as the first cell A11' are shrunk based on the maximum margin for the width of the cell A21'. In the same way, the height of the first cell A11' and the cell A12' in the same row as the first cell A11' are also shrunk to the same height value. Thus, the heights of all cells in the row where the first cell is located are consistent, and the widths of all cells in the column where the first cell is located are consistent, which well solves the misalignment problem of cells in the same row or in the same row due to only the first cell being shrunk, thereby ensuring the visual effect of the entire table and reducing the difficulty for users to view the cells in the same row or the same column, so that the user experience is improved.

It can be seen from the above that the width values of all cells in the column where the shrunk first cell is located are the target width values, and the height values of all cells in the row where the shrunk first cell is located are the target height values. However, when the target width value and target height value are relatively small, it is easy to cause the user unable to see these cells clearly because all the cells in the row and column where the first cell is located are shrunk too much, which affects writing or erasing operations of the user in these cells. Therefore, in order to at least solve this technical problem and prevent the cells from being shrunk too much, in another embodiment, such a solution that all the cells in the row and column where the first cell is located are updated according to the target minimum height value and the target minimum width value in the previous embodiment is adaptively changed. On this basis, in the step S0123', according to the target minimum height value, updating heights of all cells in the row where the first cell is located may include the following steps—in step S012311', according to the target minimum height value and the current height value, calculating and obtaining a corresponding target height value, wherein the current height value is used to indicate a current height of any cell in the row where the first cell is located, and all cells in the row where the first cell is located have a same height; in step S012312', if the target height value is greater than a preset height threshold, updating a height value of each cell in the row where the first cell is located to the target height value; and in step S012313', if the target height value is less than or equal to the preset height threshold, updating the height value of each cell in the row where the first cell is located to the preset height threshold.

In the same way, in the step S0123', according to the target minimum width value, updating widths of all cells in the column where the first cell is located may include the following steps—in step S012321', according to the target minimum width value and the current width value, calculating and obtaining a corresponding target width value, wherein the current width value is used to indicate a current width of any cell in the column where the first cell is located, and all cells on the column where the first cell is located have a same width; in step S012322', if the target width value is greater than a preset width threshold, updating a width value of each cell in the column where the first cell is located to the target width value; and in step S012323', if the target width value is less than or equal to the preset width threshold, updating the width value of each cell in the column where the first cell is located to the preset width threshold.

Thereinto, for the calculation manners of the target height value and the target width value, reference is made to the relevant description above, which will not be repeated herein. Similarly, the preset height threshold and the preset width threshold can be preset by the user as needed, or can be preset by the developer based on experience or experiment.

It can be seen from the above that the widths of all cells in the column where the first cell after being shrunk is located cannot be less than the preset width threshold, and the heights of all cells in the row where the first cell after being shrunk is located cannot be less than the preset height threshold. Therefore, it can be ensured that the width value of each cell after being shrunk will not be smaller than the preset width threshold, and the height value will not be smaller than the preset height threshold, which can well prevent the cells after the update from being too small due to the target width value or the target height value being too small, thereby ensuring that the user can clearly see the region where each shrunk cell is located, and reducing the difficulty for the user to write or erase in the cell after being shrunk.

In addition to automatically shrinking cells according to user erasing operations, in an embodiment, the present disclosure further provides a solution that can automatically expand cells according to a writing operation of the user. On this basis, the method may also include: in step S021, when a writing instruction is received, determining whether a current writing operation is in a second cell of a created table; in step S022, if the writing operation is in the second cell, when the writing operation ends, determining whether a writing content corresponding to the writing operation exceeds a boundary of the second cell; and in step S023, if the writing content exceeds the boundary of the second cell, according to the writing content, updating the second cell to expand the second cell, so that the writing content is located in an expanded second cell.

Thereinto, the user can trigger the writing instruction by clicking a writing control provided by the whiteboard application, so that the execution subject of the method can know that the user operation currently detected by the touch screen is a writing operation according to the writing instruction.

After the writing operation corresponding to the writing instruction is detected, a handwriting coordinate set of a writing trajectory of the writing operation can be acquired, and a content currently displayed on the display screen can be updated according to the handwriting coordinate set. Thereinto, based on the handwriting starting point of the writing operation, it is possible to determine whether the writing operation falls into the second cell of the created table, wherein the second cell is used to indicate any cell in the table.

On this basis, even if the cell where handwriting pixel points other than the handwriting starting point are located in the writing operation is different from the cell where the handwriting starting point is located, it is also considered that the writing operation falls into the cell where the handwriting starting point is located. Therefore, for each writing operation, it is only necessary to judge whether the handwriting starting point of the writing operation falls into a certain cell of the created table to know whether the writing operation is in the second cell of the created table, which can reduce the calculation amount involved in the position analysis of the writing operation to a large extent, and reduce the calculation burden of the system.

It should be noted that if the user needs to write a writing content in a cell other than the cell where the handwriting starting point is located, he can end the current writing operation, and perform the next writing operation. When the next writing operation is performed, it is only necessary to control the handwriting starting point to fall into the cell to be written.

Since the principle of determining whether the writing operation is in the second cell of the created table based on the handwriting starting point of the writing operation in this embodiment is the same as the above-mentioned principle of determining whether the erasing operation is in the first cell of the created table based on the erasing start point of the erasing operation, it will not be repeated herein.

After it is determined that the writing operation is in the second cell of the created table, if it is detected that the writing operation is interrupted, it can be considered that the writing operation is ended. Thereinto, when any of the following situations is detected, it can be regarded that the writing operation is interrupted—the position of the writing operation within a preset time period remains unchanged, and the writing operation is not detected at a certain moment after the writing operation occurs. The writing operation undetected at a certain moment after the writing operation occurs can be understood as—after the user performs the writing operation, the touch between the touch object used to trigger the erasing operation and the touch screen is released at a certain moment, and the input of the touch object will not be detected at this time, so it can be regarded that the writing operation is interrupted. The touch object may include at least one of a stylus and a finger, but is not limited thereto.

Since the writing content will be updated with the writing operation, the handwriting coordinate set corresponding to the writing content will also be updated. Therefore, when the writing operation ends, it is possible to determine whether the writing content exceeds the boundary of the second cell according to the current handwriting coordinate set. The determination process therein may include determining a region range of the second cell according to the coordinate information of the second cell, and determining whether there is a pixel point outside the region range of the second cell in the current handwriting coordinate set. If such a pixel point exists, it means that the writing content exceeds the boundary of the second cell. If such a pixel point does not exist, it means that the writing content does not exceed the boundary of the second cell. Thereinto, the principle of determining the region range of the second cell is the same as the principle of determining the region range of the first cell described above, which will not be repeated herein.

When it is determined that the writing content exceeds the boundary of the second cell, the second cell may be updated according to the current handwriting coordinate set of the writing content. Thereinto, in an embodiment, the process of updating the second cell in the step S023 may include—in step S0231, acquiring a maximum distance between a part of the writing content that exceeds the boundary line of the second cell and the boundary line of the second cell; and in step S0232, according to the maximum distance, updating the width or height of the second cell.

Figure 4C:
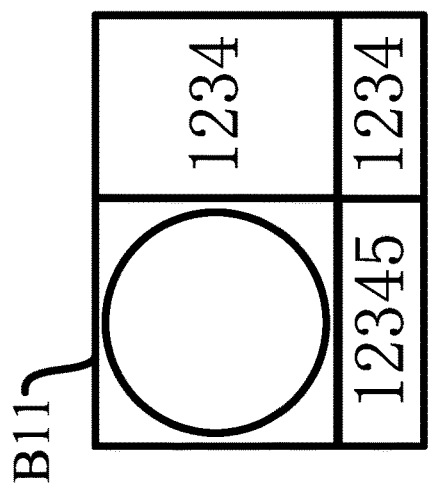
FIG. 4c is a schematic diagram showing that all cells in the row and column where the second cell in FIG. 4a is located which are expanded due to the written content exceeding boundaries of the second cell in FIG. 4a, according to an exemplary embodiment of the present disclosure.
Figure 4B:
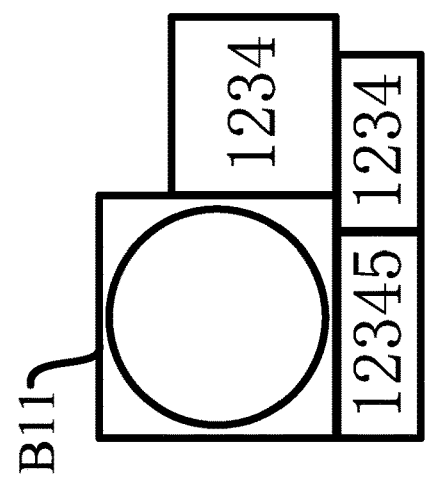
FIG. 4b is a schematic diagram showing the second cell in FIG. 4a which is expanded due to the written content exceeding boundaries of the second cell in FIG. 4a, according to an exemplary embodiment of the present disclosure.
Figure 4A:
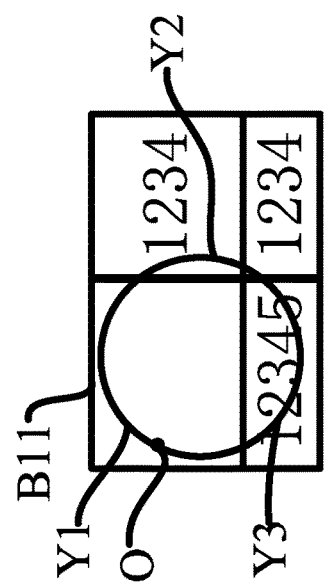
FIG. 4a is a schematic diagram of a table where a second cell without expansion processing is located, according to an exemplary embodiment of the present disclosure.

Hereinafter, an example is taken to illustrate the process of expanding the second cell according to the current handwriting coordinate set of the writing content. As shown in FIG. 4a, it is assumed that the user starts a clockwise or counterclockwise writing operation from a point O shown in FIG. 4a to draw a circle shown in FIG. 4a. On this basis, the point O is the handwriting starting point of the writing operation. It should be noted that if the circle is not drawn through handwriting by user, but is inserted through a graphic control, the point where the touch object touches the screen for the first time when the user inserts the circle can be regarded as the starting point of the handwriting. Since the point O is located in a cell B11, the circle should be located in the cell B11. However, it can be seen from FIG. 4a that the circles are composed of an arc Y1, an arc Y2, and an arc Y3, but only the arc Y1 does not exceed the boundary of the cell B11, while the arc Y2 and the arc Y3 respectively exceed the right boundary and the lower boundary of the cell B11. Therefore, it is necessary to expand the cell B11 so that all the arcs constituting the circle fall into the expanded cell B11. Thereinto, it is possible to determine the maximum distance between the part exceeding each boundary line of the cell B11 and the corresponding boundary line according to the handwriting coordinate set corresponding to the circle. In this example, since the circle only has a part exceeding the right boundary line and the lower boundary line of the cell B11, so it is only necessary to acquire a right maximum exceeding distance between a farthest pixel point on the arc Y2 from the right boundary line of the cell B11 and the right boundary line of the cell B11, and a lower maximum exceeding distance between a farthest pixel point on the arc Y3 from the lower boundary of the cell B11 and the lower boundary line of the cell B11.

After acquiring the right maximum exceeding distance, the updated width value of the cell B11 (hereinafter referred to as the second target width value) can be calculated and obtained based on the right maximum exceeding distance and the current width value of the cell B11. After acquiring the lower maximum exceeding distance, the updated height value of the cell B11 (hereinafter referred to as the second target height value) can be calculated and obtained based on the lower maximum exceeding distance and the current height value of the cell B11. Thereinto, the second target width value may be equal to the sum of the right maximum exceeding distance and the current width value of the cell B11, or may be equal to the sum of the three—the right maximum exceeding distance, the current width value of the cell B11, and a preset margin. Similarly, the second target height value can be equal to the sum of the lower maximum exceeding distance and the current height value of the cell B11, or can be equal to the sum of the three—the lower maximum exceeding distance, the current height value of the cell B11, and a preset margin. After the second target width value and the second target height value are calculated and obtained, the width value and the height value of the cell B11 may be updated to the second target width value and the second target height value, respectively, thereby expanding the cell B11. As shown in FIG. 4b, the expanded cell B11 may surround the circle inside.

From the example shown in FIG. 4b, it can be seen that only expanding the second cell will cause the second cell to be uneven with cells in the same row and column, which not only affects the visual effect of the entire table, but also may make the users unable to view quickly the content of cells in the same row or column, and this affects users' viewing. Therefore, in order to at least solve this technical problem, in an embodiment, in the process of updating the second cell, all cells in the row and column where the second cell is located can be updated, which can be understood as— updating the heights of all cells in the row where the second cell is located to the second target height value, and updating the widths of all cells in the column where the second cell is located to the second target width value. On this basis, the updated effect diagram of all cells in the row and column where the second cell is located can be seen in FIG. 4c. From FIG. 4c, it can be seen that, in addition to the second cell, all of other cells in the same column and row as the second cell have been expanded, and kept aligned with the second cell.

It should be noted that in the case where it is determined that the writing content exceeds the boundary of the second cell, if the writing content exceeds all the boundaries of the second cell, the second target width value calculated for updating the width of the second cell value can be equal to the sum of the left maximum exceeding distance, the right maximum exceeding distance, and the current width of the second cell. In another example, a preset margin can further be added on the basis of the sum of the three, so as to prevent the content part in the second cell from overlapping with the boundary line of the expanded second cell. Similarly, the second target height value calculated and obtained for updating the height of the second cell may be equal to the sum of the three—the upper maximum exceeding distance, the lower maximum exceeding distance, and the current height of the second cell. In another example, a preset margin can further be added on the basis of the sum of the three, so as to prevent the content part in the second cell from overlapping with the expanded boundary line of the second cell.

However, generally, the manner of using the second target width value and the second target height value to update the second cell can only allow the second cell to expand to a certain direction, for example, the height of the second cell can only be expanded upward or downward, which can be understood as—if the writing content exceeds the upper and lower boundary lines of the second cell, the effect of the second cell with an expanded height is that the upper boundary line moves upward or the lower boundary line moves downward. Therefore, if the height of the second cell is expanded to the second target height value by moving the upper boundary line upward, after the expansion of the second cell, the writing content exceeding the lower boundary line will be remained in a state of being exceeded. Therefore, in order to at least solve this technical problem, in an embodiment, the update process of the second cell may include—

1. If the writing content exceeds the left and right boundary lines of the second cell, acquiring the left maximum exceeding distance of the left boundary line of the second cell exceeded by the writing content and the right maximum exceeding distance of the right boundary line of the second cell exceeded by the writing content. Updating abscissas of two vertices on the left side of the second cell according to the left maximum exceeding distance, and/or updating abscissas of two vertices on the right side of the second cell according to the right maximum exceeding distance, so that the left boundary line of the second cell is moved to the left to a position surrounding the writing content or the right boundary line is moved to the right to a position surrounding the writing content.

2. If the writing content exceeds the upper and lower boundary lines of the second cell, acquiring the upper maximum exceeding distance of the upper boundary line of the second cell exceeded by the writing content and the lower maximum exceeding distance of the lower boundary line of the second cell exceeded by the writing content. Updating ordinates of two vertices on the upper side of the second cell according to the upper maximum exceeding distance, and/or updating ordinates of two vertices on the lower side of the second cell according to the lower maximum exceeding distance, so that the upper boundary line of the second cell is moved upward to a position surrounding the writing content or the lower boundary line is moved downward to a position surrounding the writing content.

It should be noted that when the writing content exceeds all the boundary lines of the second cell, by updating abscissas and ordinates of the four vertices of the second cell, the expansion of the second cell can be realized by a manner of moving all the four boundary lines of the second cell outward, so as to surround the writing content. Also, by updating the coordinate information of the second cell, the second cell is moved to the same direction as a whole, and then the expansion of the second cell can be realized by a manner of updating the height and width of the cell. For example, it is assumed that the second cell as a whole moves to the upper left direction by default, the left maximum exceeding distance value is w1, and the upper maximum exceeding distance value is h1. On this basis, on one hand, in the case where the coordinate information of the cell includes the coordinates of the four vertices of the cell, it is assumed that the coordinate information of the second cell can be expressed as $\{(x_{A21}, y_{A11}), (x_{A21}, y_{A22}), (x_{A22}, y_{A21}), (x_{A22}, y_{A22})\}$, wherein $x_{A21} < x_{A22}, y_{A21} < y_{A22}$. On this basis, the coordinate information of the second cell can be updated to $\{(x_{A21}-w_1, y_{A21}+h_1), (x_{A21}-w_1, y_{A22}+h_1), (x_{A22}-w_1, y_{A21}+h_1), (x_{A22}-w_1, y_{A22}+h_1)\}$. On the other hand, when the coordinate information of a cell includes the coordinate of one of the vertices of the cell, and the width and height of the cell, it is assumed that the coordinate information at this time records the coordinates of the left vertex of the cell, then the coordinate information of the second cell can be expressed as $\{(x_{A2}, y_{A2}), w_{A2}, h_{A2}\}$. On this basis, the coordinate information of the second cell can be updated to $\{(x_{A2}-w_1, y_{A2}+h_1), w_{A2}, h_{A2}\}$.

As a result, the effect presented on the screen is that the second cell moves to the upper left as a whole, and the second cell only moves without being expanded. It should be noted that the movement of the second cell will also cause the movements of other cells accordingly. That is, in the process of updating the coordinate information of the second cell, the coordinate information of other cells in the table where the second cell is located will also be updated. In addition, the addition and subtraction operations in the updated coordinate information are decided by reference coordinates of the second cell, which are not limited to the above expression forms.

Therefore, after the second cell is moved, the second target height value and the second target width value obtained by calculation can be used to expand the second cell, which will not be repeated herein.

It should be noted that in the process of moving the second cell, the contents of all cells in the table where the second cell is located move by the same displacement as the cells, so as to ensure that in the process of moving the second cell, the displacement of the content in each cell relative to the cell where the content is located does not change, and prevent the content in the cell from falling into other cells due to only the cell being moved but the content in the cell being not moved, which leads to the phenomenon that it is impossible to determine the cell to which the content belongs. On this basis, since the content of the cell moves together with the cell, the part that exceeds the second cell in the writing content remains exceeding the cell. Therefore, after the second cell and its writing content are moved, the writing content can be moved by the same distance to a direction opposite to the previous direction. For example, it is assumed that the writing content in the second cell exceeds its left and right boundary lines, the second cell and the writing content are controlled to translate to the left by at least the left maximum exceeding distance, then the writing content is controlled to translate to the right by at least the right maximum exceeding distance. At this time, the writing content does not exceed the left boundary line of the second cell. After that, the second target width value obtained by calculation can be used to control the expansion of the second cell to the right, which can be understood as—the width of the second cell is extended to the right, but the left boundary line of the second cell is no longer changed, so that the writing content is surrounded by the expanded second cell.

In short, it is possible to, for each cell, set in advance a reference standard used as the content in the cell. If the writing content in the cell exceeds the reference standard, the movement of the cell and its writing content are controlled firstly, after the movement, the writing content is moved back by the same distance, and then an expansion processing is performed on the cell. But if the writing content of the cell does not exceed the reference standard, it is possible to directly perform the expansion processing on the cell based on the second target height value and/or second target width value obtained by calculation, without moving the cell. It is only necessary to change the width and height attributes of the cell, or update the vertex coordinates that do not belong to the reference standard in the cell. For example, for each cell, by using the left and upper boundary lines of the cell as the reference standard, if the writing content in the cell exceeds the left or upper boundary line of the cell, it is necessary to move the cell and its writing content to the left or upward, then to move the writing content to the right or downward, and then the expansion processing is performed on the cell. If the writing content in the cell does not exceed the left or upper boundary lines of the cell, but exceeds the right or lower boundary lines, the expansion processing is directly performed on the cell without moving the cell to the left or upward. Thereinto, in the process of performing the expansion processing on the cell, the height of the cell expands to the lower boundary line, and the width expands to the right boundary line, so as not to affect the reference standard.

It can be seen that when each cell is preset with a reference standard, if the second cell needs to be moved before expansion, it will inevitably lead to the reference standard of the second cell has a certain displacement deviation relative to that before moving; if a shifted reference standard is the left boundary line of the second cell, this will cause the column where the second cell is located and all the cells on the left side of the second cell to have the same shift. Generally, the user may not want the leftmost boundary line and the uppermost boundary line of the table to be excessively shifted. Thus, the reference standard of each cell can be set as the left and upper boundary lines of the cell, so as to determine whether to move back the left or upper boundary lines according to the current shift of the left and upper boundary lines when the subsequent erasing operation occurs. On this basis, in an embodiment, after the step of updating the second cell, the method may further include—in step S031, determining whether a position of the second cell after the update is shifted relative to a position of the second cell before the update; in step S032, if the position after the update is shifted relative to the position before the update, acquiring a displacement offset of the position after the update relative to the position before the update; and in step S033, according to the displacement offset, updating a displacement offset of the table where the second cell is located.

Correspondingly, before the step of updating the first cell, the method may further include—in step S041, determining whether a displacement offset of the table where the first cell is located is zero; and in step S042, if the displacement offset of the table where the first cell is located is not zero, updating a position of the table where the first cell is located to reduce the displacement offset of the table where the first cell is located.

In the process of updating the second cell according to the writing content, if the reference standard of the second cell is moved, for example, the upper or left boundary line of the second cell is moved, it can be considered that the position of the second cell after the update is shifted relative to the position before the update. The displacement offset at this time can be recorded as the number of pixel points moved by the boundary line. For example, it is assumed that the upper boundary line of the second cell moves upward by 10 pixel points, the left boundary line moves to the left by 5 pixel points, then extendY=10 can be used to record that the upper boundary line moves upward by 10 pixel points, and extendX=5 can be used to record that the left boundary line moves to the left by 5 pixel points. Thereinto, if extendY and extendX are non-zero, it is necessary to increase the current displacement offset on the basis of the original extendY and extendX as the current total displacement offset of the table where the second cell is located, which can be understood as—if the position of the second cell after the update is shifted relative to the position before the update, extendY can be updated to extendY=extendY+10, and extendX can be updated to extendX=extendX+5, which can be understood as a value assignment operation. In the next writing operation, if the writing content exceeds the reference standard of the cell to cause a movement of the reference standard of the cell, it is necessary to add the current displacement offset on the previous displacement offset. For example, it is assumed that the current displacement offset is—the left boundary line moves to the left by 6 pixel points, and the upper boundary line does not move, then only extendX can be updated at this time. The updated extendX=extendX (representing the offset in the X axis direction after the last update)+6.

It should be noted that, due to the expansion of the second cell (this expansion can be expressed as the expansion process of the width or height of the second cell, and does not involve the movement process of the reference standard of the second cell), the displacement of the abscissa or ordinate corresponding to boundary lines other than its reference standard is not recorded in the displacement offset, and due to the expansion of the second cell, the displacement of the reference standard of cells other than the second cell is also not recorded in the displacement offset. It can be understood as—it is only necessary to record the displacement offset of the reference standard of the moved cell.

The updated displacement offset extendX in the X axis direction and the displacement offset extendY in the Y axis direction can be recorded in the table properties.

After the displacement offsets extendX and extendY of the table are recorded, if an erasing operation occurs in the first cell in subsequent steps, before the first cell is updated, the properties of the table where the first cell is located can be read, so as to acquire extendX and extendY therefrom, and determine whether extendX and extendY are both zero. If extendX and extendY are both zero, it means that the current position of the table is not shifted relative to that when being created, and the operation of updating the first cell can be performed directly according to the erasing operation. If extendX or extendY is non-zero, it is assumed that the reference standard of the first cell is the left and upper boundary lines. In the case where extendX is non-zero, extendX can be compared with the first width distance value. If extendX is greater than the first width distance value, the first cell is moved to the right by a distance corresponding to the first width distance value, and extendX is updated to extendX=extendX−the first width distance value. If extendX is less than or equal to the first width distance value, the first cell is moved to the right by a distance corresponding to extendX, and extendX is updated to extendX=0. Thereinto, in the process of moving the first cell to the right, the column where the first cell is located and all the cells on the left side of the first cell will be moved to the right by the same distance as the first cell. Thus, the leftmost boundary line of the table where the first cell is located can be moved to the right, thereby reducing the displacement deviation of the table relative to that when being created. In the case where extendY is non-zero, extendY can be compared with the first height distance value. If extendY is greater than the first height distance value, the first cell is moved downward by a distance corresponding to the first height distance value, and extendY is updated to extendY=extendY−the first height distance value. If extendY is less than or equal to the first height distance value, the first cell is moved downward by a distance corresponding to extendY, and extendY is updated to extendY=0. Thereinto, in the process of moving the first cell downward, the row where the first cell is located and all the cells on the upper side of the first cell will be moved downward by the same distance as the first cell. Thus, the uppermost boundary line of the table where the first cell is located can be moved downward, thereby reducing the displacement deviation of the table relative to that when being created.

After the displacement offset of the table where the first cell is located is reduced, the first cell may be updated according to the erasing operation. For the update process, reference is made to the above-mentioned related description, which will not be repeated herein.

It should be noted that in any of the above embodiments, if the stored coordinate information of the cell includes the coordinate information of the four vertices of the cell, the update of the height or width of the cell mentioned therein further includes the update of the coordinates of the four vertices of the cell. In addition, the first cell and the second cell may belong to the same table, or may belong to different tables. Although the reference standard of the above-mentioned cell is described by the boundary line, in another embodiment, the reference standard of the cell can also be described as a straight line where the abscissa of a vertex of the cell is located and a straight line where the ordinate of a vertex of the cell is located.

Figure 5:
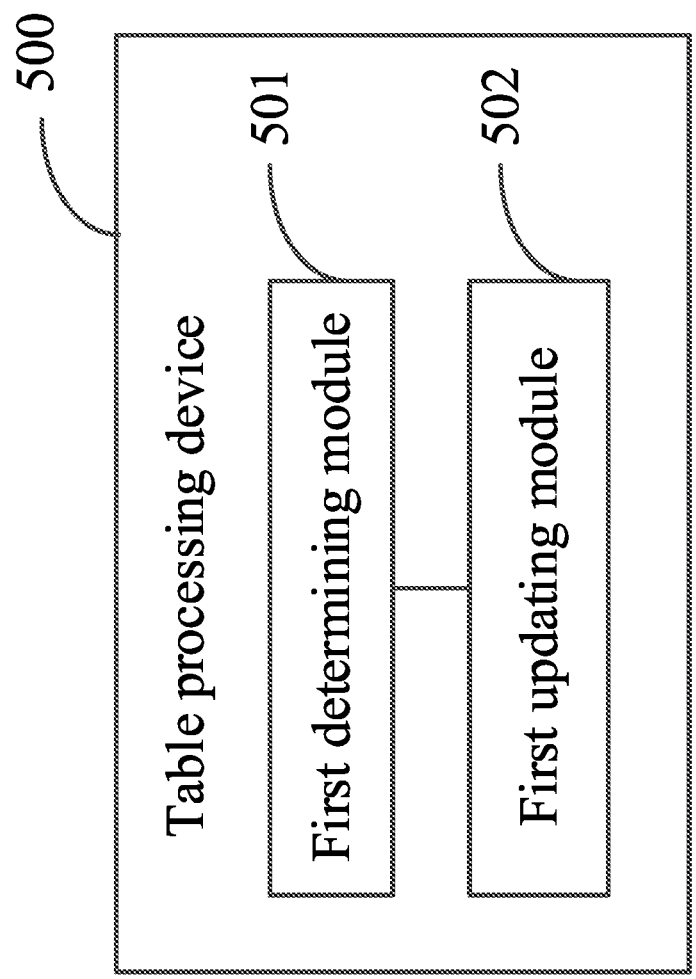
FIG. 5 is a structure block diagram of a table processing device, according to an exemplary embodiment of the present disclosure.

Corresponding to the above-mentioned embodiment of the table processing method, the embodiment of the present disclosure further provides a table processing device, which can be applied to a laptop computer, a desktop computer, a tablet computer, a mobile phone, a projector, or an interactive white board. As shown in FIG. 5, FIG. 5 is a structure block diagram of a table processing device according to an exemplary embodiment of the present disclosure. The table processing device 500 includes a first determining module 501 configured to, when an erasing instruction is received, determine whether the current erasing operation is in a first cell of a created table, and a first updating module 502 configured to, when the first determining module 501 determines that the erasing operation is in the first cell and the erasing operation ends, update the first cell, so as to shrink the first cell.

In an embodiment, the first updating module 502 may include a first acquiring unit configured to, when there is an unerased content in the first cell, acquire a minimum height value and a minimum width value of a vacant region between a boundary of the first cell and an edge of the unerased content; and a first updating unit configured to, according to the minimum height value and the minimum width value, respectively update a height and a width of the first cell.

In an embodiment, the first updating unit may include a first calculating sub-unit configured to, according to a current height value of the first cell and the minimum height value, calculate and obtain a target height value for updating the height of the first cell, and according to a current width value of the first cell and the minimum width value, calculate and obtain a target width value for updating the width of the first cell; a first updating sub-unit configured to, when the target height value is greater than a preset height threshold, update a height value of the first cell to the target height value, and when the target height value is less than or equal to the preset height threshold, update the height value of the first cell to the preset height threshold; and a second updating sub-unit configured to, when the target width value is greater than a preset width threshold, update a width value of the first cell to the target width value, and when the target width value is less than or equal to the preset width threshold, update the width value of the first cell to the preset width threshold.

In an embodiment, the first updating module 502 may include a second updating unit configured to, when there is no unerased content in the first cell, respectively update a height value and a width value of the first cell to a preset height threshold and a preset width threshold.

In another embodiment, the first updating module 502 may include a second acquiring unit configured to, for each of all cells in a row where the first cell is located, acquire a minimum height value of a vacant region between a boundary of the cell and an edge of a content in the cell, and for each of all cells in a column where the first cell is located, acquire a minimum width value of a vacant region between a boundary of the cell and an edge of a content in the cell; a third acquiring unit configured to acquire a target minimum height value with a smallest value from all the minimum height values, and acquire a target minimum width value with a smallest value from all the minimum width values; and a third updating unit configured to, according to the target minimum height value, update heights of all cells in the row where the first cell is located, and according to the target minimum width value, update widths of all cells in the column where the first cell is located.

In an embodiment, the third updating unit may include a second calculating sub-unit configured to, according to the target minimum height value and a current height value, calculate and obtain a corresponding target height value, wherein the current height value is used to indicate a current height of any cell in the row where the first cell is located, and all cells on the row where the first cell is located have a same height; a third updating sub-unit configured to, when the target height value is greater than a preset height threshold, update a height value of each cell in the row where the first cell is located to the target height value; and a fourth updating sub-unit configured to, when the target height value is less than or equal to the preset height threshold, update the height value of each cell in the row where the first cell is located to the preset height threshold.

In an embodiment, the third updating unit may include a third calculating sub-unit configured to, according to the target minimum width value and the current width value, calculate and obtain a corresponding target width value, wherein the current width value is used to indicate a current width of any cell in the column where the first cell is located, and all cells on the column where the first cell is located have a same width; a fifth updating sub-unit configured to, when the target width value is greater than a preset width threshold, update a width value of each cell in the column where the first cell is located to the target width value; and a sixth updating sub-unit configured to, when the target width value is less than or equal to the preset width threshold, update the width value of each cell in the column where the first cell is located to the preset column threshold.

In an embodiment, the device may further include a second determining module configured to, when a writing instruction is received, determine whether a current writing operation is in a second cell of a created table; a third determining module configured to, when the writing operation is in the second cell and the writing operation ends, determine whether a writing content corresponding to the writing operation exceeds a boundary of the second cell; and a second updating module configured to, when the writing content exceeds the boundary of the second cell, according to the writing content, update the second cell to expand the second cell, so that the writing content is located in an expanded second cell.

In an embodiment, the device may further include a first displacement determining module configured to, after the second cell is updated, determine whether a position of the second cell after the update is shifted relative to a position of the second cell before the update; an offset acquiring module configured to, when a position after the update is shifted relative to a position before the update, acquire a displacement offset of the position after the update relative to the position before the update; and an offset updating module configured to, according to the displacement offset, updating a displacement offset of the table where the second cell is located.

In an embodiment, the device may further include a second displacement determining module configured to, before the first cell is updated, determine whether a displacement offset of the table where the first cell is located is zero; and a position updating module configured to, if the displacement offset of the table where the first cell is located is non-zero, update a position of the table where the first cell is located to reduce the displacement offset of the table where the first cell is located.

For the implementation process of the functions and roles of each module and unit in the above-mentioned device, reference is made to the implementation process of the corresponding steps in the above-mentioned method for details, which will not be repeated herein.

For the device embodiment, since it basically corresponds to the method embodiments, the relevant part can refer to the part of the description of the method embodiments. The device embodiments described above are merely illustrative, wherein the units described as separate components may or may not be physically separated, and the components shown as units may or may not be physical units.

Corresponding to the above-mentioned embodiments of the table processing method, an embodiment of the present disclosure further provides an intelligent interactive tablet, which includes a processor; and a storage device configured to store a computer program executed by the processor, wherein when executing the program, the processor implements steps of the table processing method in any one of the above-mentioned embodiments.

Thereinto, the interactive white board can be an integrated device that controls the content displayed on the display screen and realizes human-computer interaction through touch technology, which can integrate one or more functions such as a projector, an electronic whiteboard, a screen, a loudspeaker box, a TV, and a video conference terminal.

In an embodiment, the interactive white board can establish a data connection with at least one external device. The external devices may include, but are not limited to, a mobile phone, a laptop computer, a USB flash drive, a tablet computer, a desktop computer, a server, and the like. This embodiment does not limit the communication manner of the data connection between the external device and the interactive white board. For example, the communication manner may include, but is not limited to, USB connection, Internet, local area network, Bluetooth, WIFI, or ZigBee protocol.

Corresponding to the above-mentioned embodiments of the table processing method, the present disclosure further provides a computer-readable storage medium, on which a computer program is stored, and when the program is executed by a processor, steps of the table processing method in any one of the above-mentioned embodiments are implemented.

The present disclosure may adopt a form of a computer program product implemented on one or more storage media (including but not limited to disk storage, CD-ROM, optical storage, etc.) including program codes. Computer-readable storage media include permanent and non-permanent, removable and non-removable media, and information storage can be achieved by any method or technology. The information can be computer-readable instructions, data structures, program modules, or other data. Examples of computer-readable storage media include, but are not limited to, phase change memory (PRAM), static random access memory (SRAM), dynamic random access memory (DRAM), other types of random access memory (RAM), read-only memory (ROM), electrically erasable programmable read-only memory (EEPROM), flash memory or other memories, compact disc read-only memory (CD-ROM), digital versatile disc (DVD) or other optical storage, magnetic cassette tape, magnetic disk storage or other magnetic storage devices or any other non-transmission media which can be used to store information capable of being accessed by computing devices.

The foregoing description of the specific implementations can be readily modified and/or adapted for various applications. Therefore, such adaptations and modifications are intended to be within the meaning and range of equivalents of the disclosed implementations, based on the teaching and guidance presented herein.

The breadth and scope of the present disclosure should not be limited by any of the above-described exemplary implementations, but should be defined only in accordance with the following claims and their equivalents.

What is claimed is:

1. A method for table processing applied to a device supporting touch inputs, comprising:

creating a table in a whiteboard application, and inserting a table content in the table, wherein the table content comprises a picture, a geometric figure and/or a text;

receiving an erasing instruction for a displaying content of the whiteboard application, wherein the erasing instruction is triggered by an erasing operation of a user on an interface of the whiteboard application;

acquiring an erasing coordinate set of an erasing trajectory of the erasing operation when the erasing instruction is received, and determining a cell where an erasing start point of the erasing trajectory is located as a first cell targeted by the erasing operation in response to the erasing coordinate set comprises erasing pixel points located in different cells of the created table;

updating and displaying the display content of the first cell according to the erasing coordinate set, so as to make an erased content disappear with the erasing operation; and updating the first cell when the erasing operation ends, so as to shrink the first cell.

2. The method according to claim 1, wherein updating the first cell comprises:

when there is an unerased content in the first cell, acquiring a minimum height value and a minimum width value of a vacant region between a boundary line of the first cell and an edge of the unerased content; and updating a height and a width of the first cell respectively according to the minimum height value and the minimum width value.

3. The method according to claim 2, wherein updating the height and the width of the first cell respectively according to the minimum height value and the minimum width value comprises:

obtaining a target height value for updating the height of the first cell according to a current height value of the first cell and the minimum height value;

obtaining a target width value for updating the width of the first cell according to a current width value of the first cell and the minimum width value;

updating a height value of the first cell to the target height value in response to the target height value is greater than a preset height threshold;

updating the height value of the first cell to the preset height threshold in response to the target height value is less than or equal to the preset height threshold;

updating a width value of the first cell to the target width value in response to the target width value is greater than a preset width threshold; and updating the width value of the first cell to the preset width threshold in response to the target width value is less than or equal to the preset width threshold.

4. The method according to claim 1, wherein updating the first cell comprises:

updating a height value and a width value of the first cell to a preset height threshold and a preset width threshold respectively when there is no unerased content in the first cell.

5. The method according to claim 1, wherein updating the first cell comprises:

acquiring a minimum height value of a vacant region between a boundary line of the cell and an edge of a content in the cell for each of all cells in a row where the first cell is located;

acquiring a minimum width value of a vacant region between a boundary line of the cell and an edge of a content in the cell for each of all cells in a column where the first cell is located;

acquiring a target minimum height value with a smallest value from all the minimum height values;

acquiring a target minimum width value with a smallest value from all the minimum width values;

updating heights of all cells in the row where the first cell is located according to the target minimum height value; and updating widths of all cells in the column where the first cell is located according to the target minimum width value.

6. The method according to claim 5, wherein updating heights of all cells in the row where the first cell is located according to the target minimum height value comprises:

obtaining a target height value according to the target minimum height value and a current height value, wherein the current height value indicates a current height of any cell in the row where the first cell is located, and wherein all cells on the row where the first cell is located have a same height;

updating a height value of each cell in the row where the first cell is located to the target height value in response to the target height value is greater than a preset height threshold; and updating the height value of each cell in the row where the first cell is located to the preset height threshold in response to the target height value is less than or equal to the preset height threshold.

7. The method according to claim 5, wherein updating widths of all cells in the column where the first cell is located according to the target minimum width value comprises:

obtaining a target width value according to the target minimum width value and a current width value, wherein the current width value indicates a current width of any cell in the column where the first cell is located, and wherein all cells in the column where the first cell is located have a same width;

updating a width value of each cell in the column where the first cell is located to the target width value in response to the target width value is greater than a preset width threshold; and updating the width value of each cell in the column where the first cell is located to the preset width threshold in response to the target width value is less than or equal to the preset width threshold.

8. The method according to claim 1, further comprising:

determining whether a current writing operation is in a second cell of the created table when a writing instruction is received;

in response to the writing operation is in the second cell, determining whether a writing content corresponding to the writing operation exceeds a boundary line of the second cell when the writing operation ends; and in response to the writing content exceeds the boundary line of the second cell, updating the second cell according to the writing content to expand the second cell, so that the writing content is located in an expanded second cell.

9. The method according to claim 8, wherein, after the step of updating the second cell, the method further comprises:

determining whether a position of the second cell after the update is shifted relative to a position of the second cell before the update;

acquiring a displacement offset of the position after the update relative to the position before the update in response to the position after the update is shifted relative to the position before the update; and updating a displacement offset of the table where the second cell is located according to the displacement offset.

10. The method according to claim 9, wherein, before the step of updating the first cell, the method further comprises:

determining whether a displacement offset of the table where the first cell is located is zero; and updating a position of the table where the first cell is located to reduce the displacement offset of the table where the first cell is located in response to the displacement offset of the table where the first cell is located is non-zero.

11. The method according to claim 8, further comprising:

acquiring a handwriting coordinate set of a writing trajectory of the writing operation when the writing instruction is detected; and determining a cell where a handwriting start point of the writing trajectory is located as the second cell targeted by the writing operation in response to the writing coordinate set comprises handwriting pixel points located in different cells of the created table.

12. The method according to claim 8, further comprising:

acquiring a maximum distance between a part of the writing content that exceeds the boundary line of the second cell and the boundary line of the second cell; and updating a width or height of the second cell according to the maximum distance.

13. The method according to claim 8, further comprising:

updating heights of all cells in a column where the second cell is located to a second target height value; and updating widths of all cells in a row where the second cell is located to a second target width value, wherein the second target height value is an updated height value of the second cell, and wherein the second target width value is an updated width value of the second cell.

14. The method according to claim 8, further comprising:

acquiring a left maximum exceeding distance of the writing content exceeding a left boundary line of the second cell and a right maximum exceeding distance of the writing content exceeding a right boundary line of the second cell when the writing content exceeds the left boundary line and the right boundary line of the second cell; and updating abscissas of two vertices on a left side of the second cell according to the left maximum exceeding distance, and/or updating abscissas of two vertices on a right side of the second cell according to the right maximum exceeding distance, so that the left boundary line of the second cell is moved to the left to a position surrounding the writing content or the right boundary line is moved to the right to a position surrounding the writing content.

15. An interactive white board supporting touch inputs, comprising:

a processor; and a storage device, configured to store a computer program executed by the processor, wherein, when executing the computer program, the processor implements a method comprising:

creating a table in a whiteboard application, and inserting a table content in the table, wherein the table content comprises a picture, a geometric figure and/or a text;

receiving an erasing instruction for a displaying content of the whiteboard application, wherein the erasing instruction is triggered by an erasing operation of a user on an interface of the whiteboard application;

acquiring an erasing coordinate set of an erasing trajectory of the erasing operation when the erasing instruction is received, and determining a cell where an erasing start point of the erasing trajectory is located as a first cell targeted by the erasing operation in response to the erasing coordinate set comprises erasing pixel points located in different cells of the created table;

updating and displaying the display content of the first cell according to the erasing coordinate set, so as to make an erased content disappear with the erasing operation; and updating the first cell when the erasing operation ends, so as to shrink the first cell.

16. A computer-readable non-transient storage medium, on which a computer program is stored, characterized in that, when the computer program is executed by a processor, the processor implements a method comprising:

creating a table in a whiteboard application, and inserting a table content in the table, wherein the table content comprises a picture, a geometric figure and/or a text;

receiving an erasing instruction for a displaying content of the whiteboard application, wherein the erasing instruction is triggered by an erasing operation of a user on an interface of the whiteboard application;

acquiring an erasing coordinate set of an erasing trajectory of the erasing operation when the erasing instruction is received, and determining a cell where an erasing start point of the erasing trajectory is located as a first cell targeted by the erasing operation in response to the erasing coordinate set comprises erasing pixel points located in different cells of the created table;

updating and displaying the display content of the first cell according to the erasing coordinate set, so as to make an erased content disappear with the erasing operation; and updating the first cell when the erasing operation ends, so as to shrink the first cell.

\* \* \* \* \*